(12) United States Patent
Jang et al.

(10) Patent No.: US 7,912,116 B2
(45) Date of Patent: Mar. 22, 2011

(54) APPARATUS AND METHOD FOR TRANSMITTING DATA USING RELAY STATION IN A BROADBAND WIRELESS COMMUNICATION SYSTEM

(75) Inventors: Jae-Hyuk Jang, Deagu (KR); Eun-Taek Lim, Suwon-si (KR); Young-Bin Chang, Anyang-si (KR); Jung-Min Ro, Seoul (KR); Tae-Young Kim, Seongnam-si (KR); Dong-Seek Park, Yongin-si (KR); Young-Kwon Cho, Suwon-si (KR); Joon-Young Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1211 days.

(21) Appl. No.: 11/528,169

(22) Filed: Sep. 27, 2006

(65) Prior Publication Data

US 2007/0081603 A1 Apr. 12, 2007

(30) Foreign Application Priority Data

Sep. 28, 2005 (KR) ......................... 10-2005-0090750

(51) Int. Cl.
*H04B 1/38* (2006.01)
*H04B 3/36* (2006.01)
*H04L 12/66* (2006.01)
(52) U.S. Cl. ............................. 375/220; 455/7; 370/463
(58) Field of Classification Search .................. 375/220; 370/463; 455/7
See application file for complete search history.

(56) References Cited

U.S. PATENT DOCUMENTS

| 2003/0125067 A1* | 7/2003 | Takeda et al. ................. 455/522 |
| 2003/0126536 A1* | 7/2003 | Gollamudi et al. ........... 714/748 |
| 2003/0152062 A1 | 8/2003 | Terry et al. |
| 2003/0153276 A1 | 8/2003 | Terry et al. |
| 2005/0002327 A1* | 1/2005 | Li ................................ 370/210 |

FOREIGN PATENT DOCUMENTS

| JP | 2005-086594 | 3/2005 |
| KR | 1020000002504 | 1/2000 |

OTHER PUBLICATIONS

Yunnan et al. "Information Exchange in Wireless Networks with Network Coding and Physical-layer Broadcast", 2005 Conference on Information Sciences and Systems, The Johns Hopkins University, Mar. 16-18, 2005, pp. 1-6.*

* cited by examiner

*Primary Examiner* — David C Payne
*Assistant Examiner* — Vineeta S Panwalkar
(74) *Attorney, Agent, or Firm* — The Farrell Law Firm, P.C.

(57) ABSTRACT

A frame configuration method and apparatus for sending data via an RS in a broadband wireless communication system are provided. In the reception mode, the RS monitors reception of data in an $(n-1)^{th}$ frame from an MS and reception of data in an $n^{th}$ frame from a BS. The RS classifies the data received from the MS and the data received from the BS as combinable data to be sent in combination or as non-combinable data to be sent separately, and stores the classified data distinguishably. When the RS transitions to a transmission mode, it determines whether to XOR-operate or mask the stored data. If the stored data can be masked, the RS XOR-operates the stored data and sends the masked data to the BS and the MS.

12 Claims, 7 Drawing Sheets

APPARATUS AND METHOD FOR TRANSMITTING DATA USING RELAY STATION IN A BROADBAND WIRELESS COMMUNICATION SYSTEM

This application claims priority under 35 U.S.C. §119 to an application entitled "Apparatus and Method for Transmitting Data Using Relay Station in a Broadband Wireless Communication System" filed in the Korean Intellectual Property Office on Sep. 28, 2005 and assigned Serial No. 2005-90750, the contents of which are incorporated herein by reference.

BACKGROUND OF THE INVENTION

1. Field of the Invention

The present invention relates generally to a broadband wireless communication system adopting a relay scheme, and in particular, to a frame configuration method and apparatus for providing a relay service in the broadband wireless communication system adopting the relay scheme.

2. Description of the Related Art

Along with the diversification of service types available through mobile terminals, broadband systems have attracted interest and new systems are under development. For deployment of a new system, installation of additional Base Stations (BSs) requires configuration of a new wired network, increasing cost. Therefore, relay communication technology which adds a Relay Station (RS) to relay between a BS and a Mobile Station (MS) is considered as promising.

Figure 1:
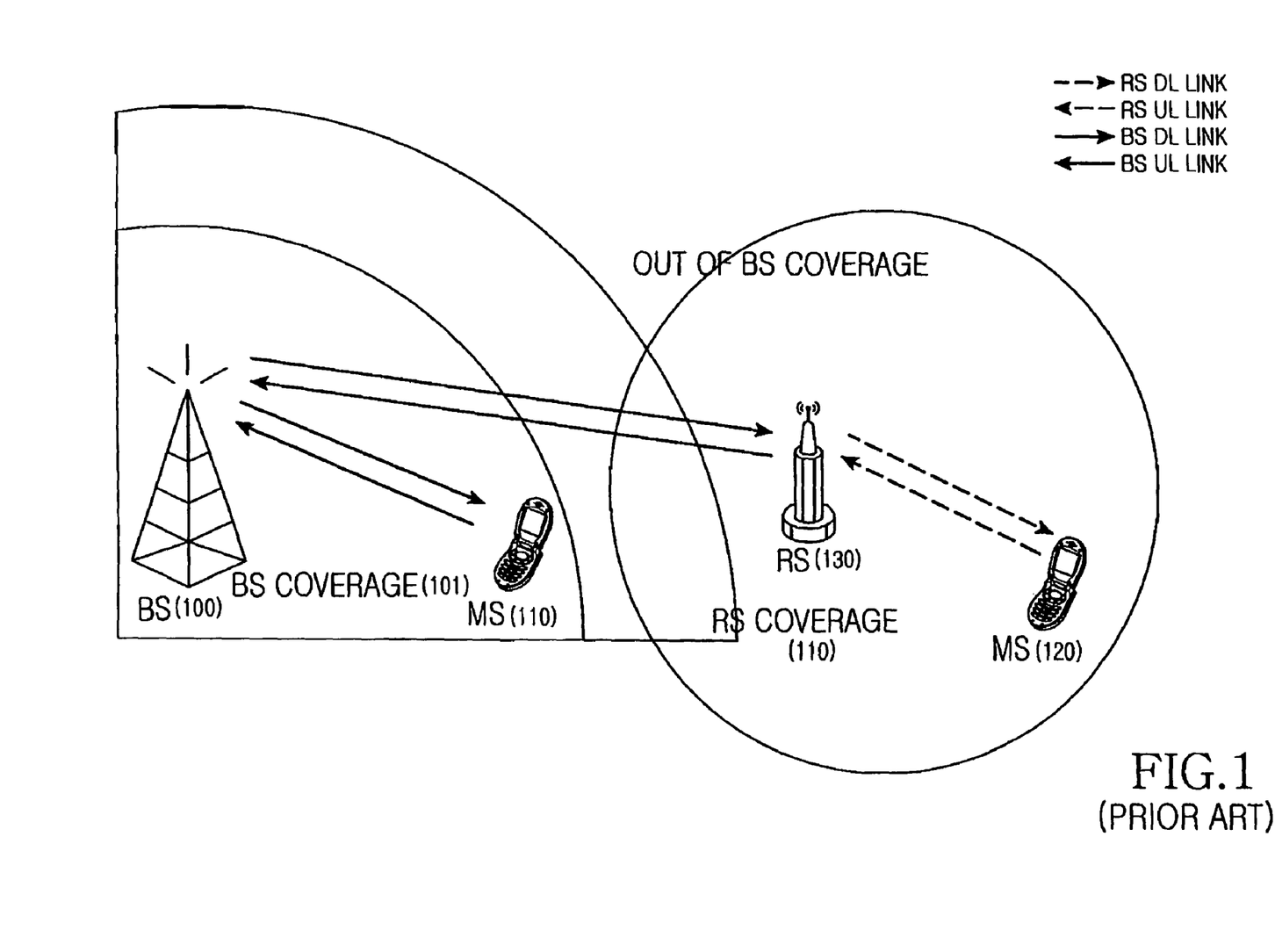
FIG. 1 illustrates the configuration of a typical cellular system using RSs.

FIG. 1 illustrates the configuration of a typical cellular system using RSs.

Referring to FIG. 1, an MS 110 within the cell area 101 of a BS 100 communicates directly with the BS 100. On the other hand, an MS 120, which is located outside the cell area 101 of the BS 100 and thus in a poor channel state, communicates with the BS 100 via an RS 130.

The RS 130 provides better-quality radio channels to MSs 110 and 120 when they communicate with BS 100 but in a bad channel state, as they are located at a boundary of the cell area 101. Thus, BS 100 can provide a high-speed data channel to the cell boundary area using a multi-hop relay scheme and thus expand its cell coverage.

Hence, RS 130 serves the purpose of expanding cell area 101 of BS 100 or increasing data rate by diversity effect. RS 130 may operate in an Amplify and Forward (AF) manner or a Decode and Forward (DF) manner.

For communications with RS 130, a frame has to be so configured as to support both a direct link and a relay link.

Figure 2:
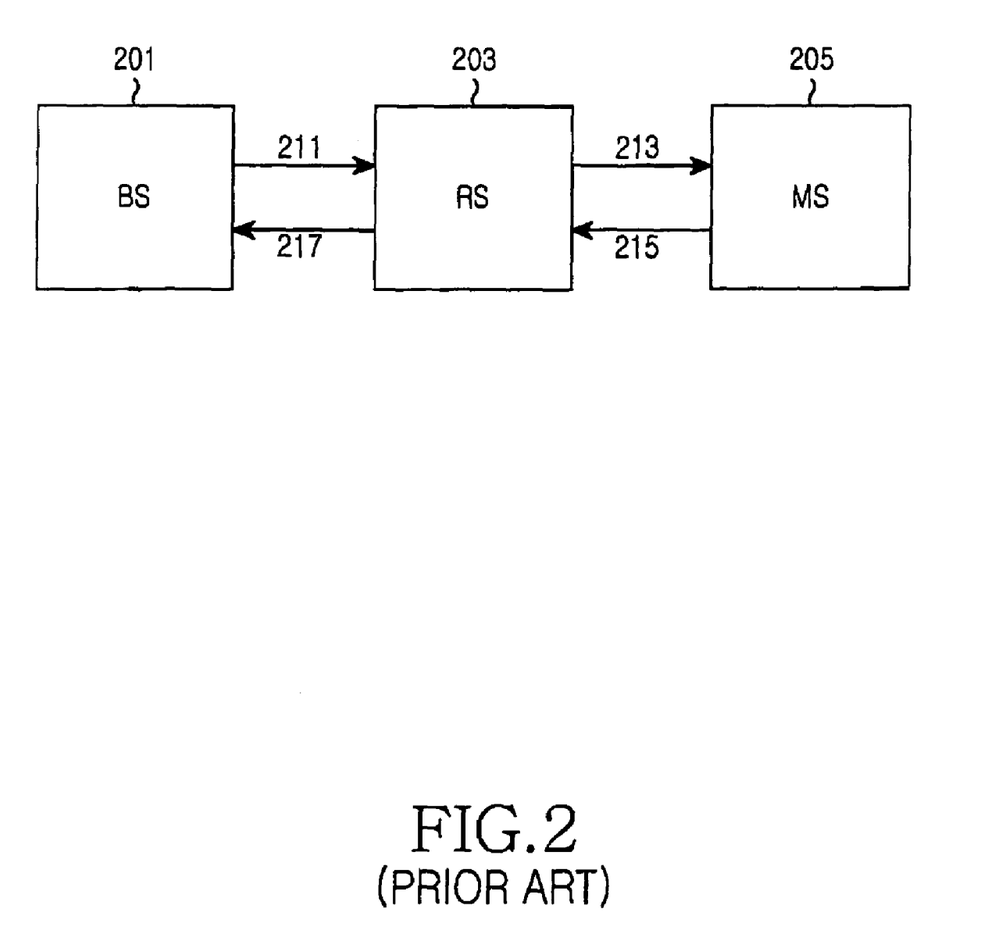
FIG. 2 illustrates a communication procedure via an RS in a typical TDD system.

FIG. 2 illustrates a communication procedure using an RS in a typical Time Division Duplexing (TDD) system.

Referring to FIG. 2, a BS 201 sends data to an MS 205 outside its cell area via an RS 203. BS 201 sends data to RS 203 in step 211 and then RS 203 forwards the data to MS 205 in step 213.

When MS 205 sends uplink data to RS 203 in step 215, RS 203 forwards the received data to BS 201 in step 217.

Figure 3:
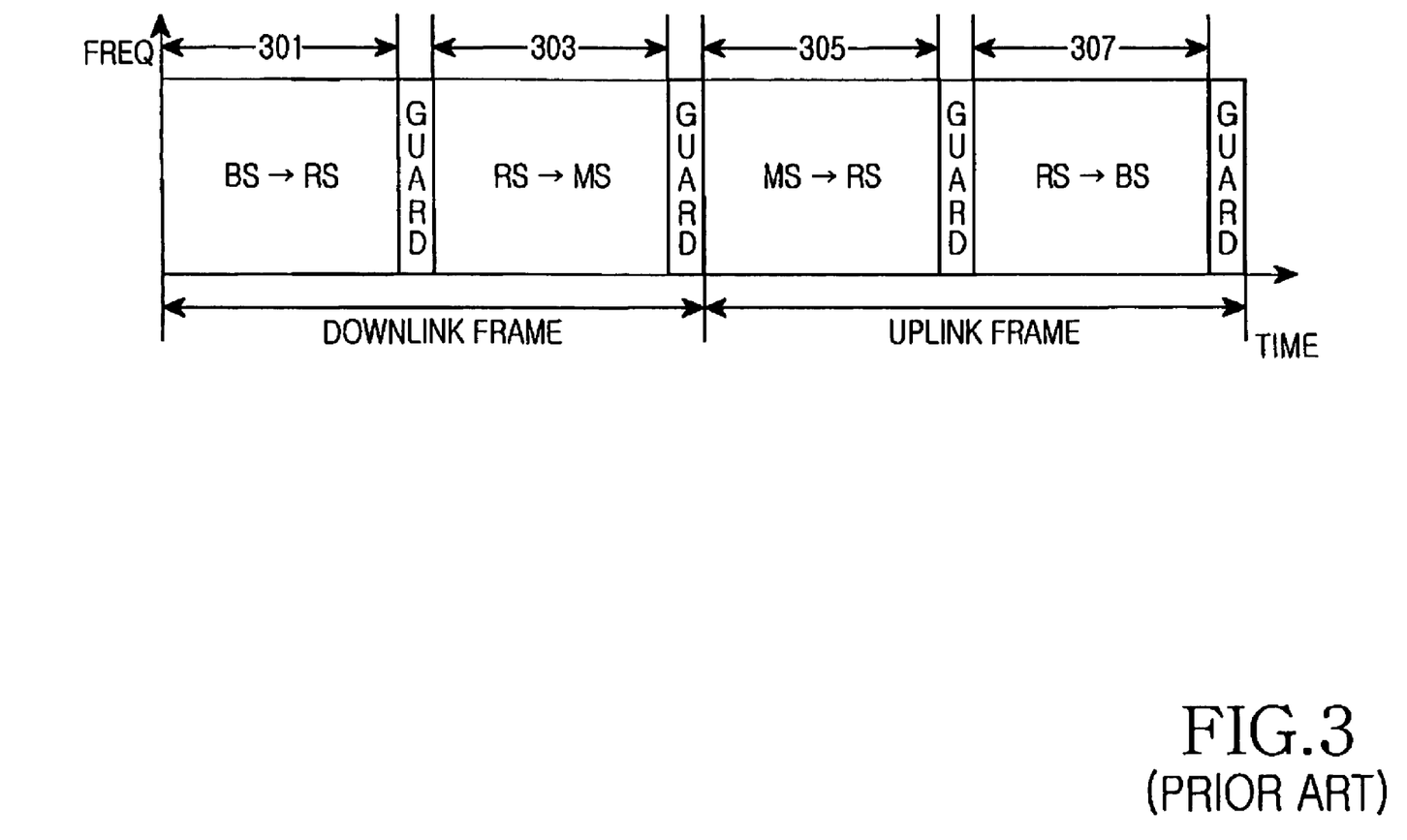
FIG. 3 illustrates a frame structure for communications via the RS in the typical TDD system.

FIG. 3 illustrates a frame structure for communications via an RS in the typical TDD system. The horizontal axis represents time and the vertical axis represents frequency. An MS connected to a BS via a direct link is called an $MS_{BS}$, and an MS connected to a BS via an RS is called an $MS_{RS}$.

Referring to FIG. 3, a frame is divided into downlink and uplink frames.

The downlink frame is broken up into a period 301 for downlink transmission from a BS to an RS or an $MS_{BS}$, and a period 303 for downlink transmission from the RS to an $MS_{RS}$. During the period 303, the RS forwards data received from the BS to the $MS_{RS}$.

The uplink frame is broken up into a period 305 for uplink transmission from the $MS_{RS}$ to the RS and a period 307 for uplink transmission from the RS or the $MS_{BS}$ to the BS.

A guard region is defined between data transmission periods, taking into account delay spread and downlink/uplink switching delay.

As described above, a drawback with the above frame configuration is increased delay with the number of hops between radio ends. When the BS sends data to the MS via the RS, delay between the radio ends is at least doubled. Moreover, the existence of a time guard region between data transmission periods increases overhead.

SUMMARY OF THE INVENTION

An object of the present invention is to substantially solve at least the above problems and/or disadvantages and to provide at least the advantages below. Accordingly, an object of the present invention is to provide a frame configuration method for sending data via an RS, and transmitting and receiving apparatuses supporting the same in a broadband wireless communication system.

Another object of the present invention is to provide a frame configuration method for reducing overhead and delay in data transmission via an RS, transmitting and receiving apparatuses supporting the same in a broadband wireless communication system.

The above objects are achieved by providing a frame configuration method for sending data via an RS and transmitting and receiving apparatuses supporting the same in a broadband wireless communication system.

According to one aspect of the present invention, in a receiver of an RS in a broadband wireless communication system, a decoder demodulates received data in a predetermined demodulation scheme and decodes the demodulated data at a predetermined coding rate. A channel information storage acquires channel information for each MS from feedback information received from the MS and stores the channel information. A data classifier classifies the decoded data as combinable data to be sent after combination or as non-combinable data to be sent separately. A data storage separately stores combinable data and non-combinable data classified by the data classifier.

According to another aspect of the present invention, in a transmitter of an RS in a broadband wireless communication system, a network encoder combines data received from a BS with data received from an MS, when it is determined that the data are to be sent in combination. A channel configurer configures an actual transmission channel with the combined data and non-combinable data received from the BS and the MS to be sent separately without combining. An encoder encodes the configured channel data at a predetermined coding rate and modulates the coded data in a predetermined modulation scheme.

According to a further aspect of the present invention, in a method of relaying data in an RS in a broadband wireless communication system, the RS monitors reception of data in an $(n-1)^{th}$ frame from an MS and reception of data in an $n^{th}$ frame from a BS in a reception mode. The RS classifies the data received from the MS and the data received from the BS as combinable data to be sent in combination or as non-combinable data to be sent separately, and stores the classified data distinguishably. When the RS transitions to a transmission mode, it determines whether the stored data is combinable data or non-combinable data. If the stored data is combinable data, the RS combines the stored data and sends the combined data to the BS and the MS.

According to still another aspect of the present invention, in a frame configuring method for sending data via an RS in a broadband wireless communication system, a first subframe is configured for delivering data from a BS to the RS for a first period in a frame, a second subframe is configured for delivering data from the RS to the BS and an MS for a second period in the frame, and a third subframe is configured for delivering data from the MS to the RS for a third period in the frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a frame configuration method and apparatus for sending data via an RS in a broadband wireless communication system. The following description is made on the assumption that there are only MSs communicating with a BS via an RS, with no MSs directly communicating with the BS.

While the present invention is described in the context of a Time Division Duplexing-Orthogonal Frequency Division Multiple Access (TDD-OFDMA) wireless communication system, it is to be understood that the present invention is applicable to any other multiple access scheme.

Figure 4:
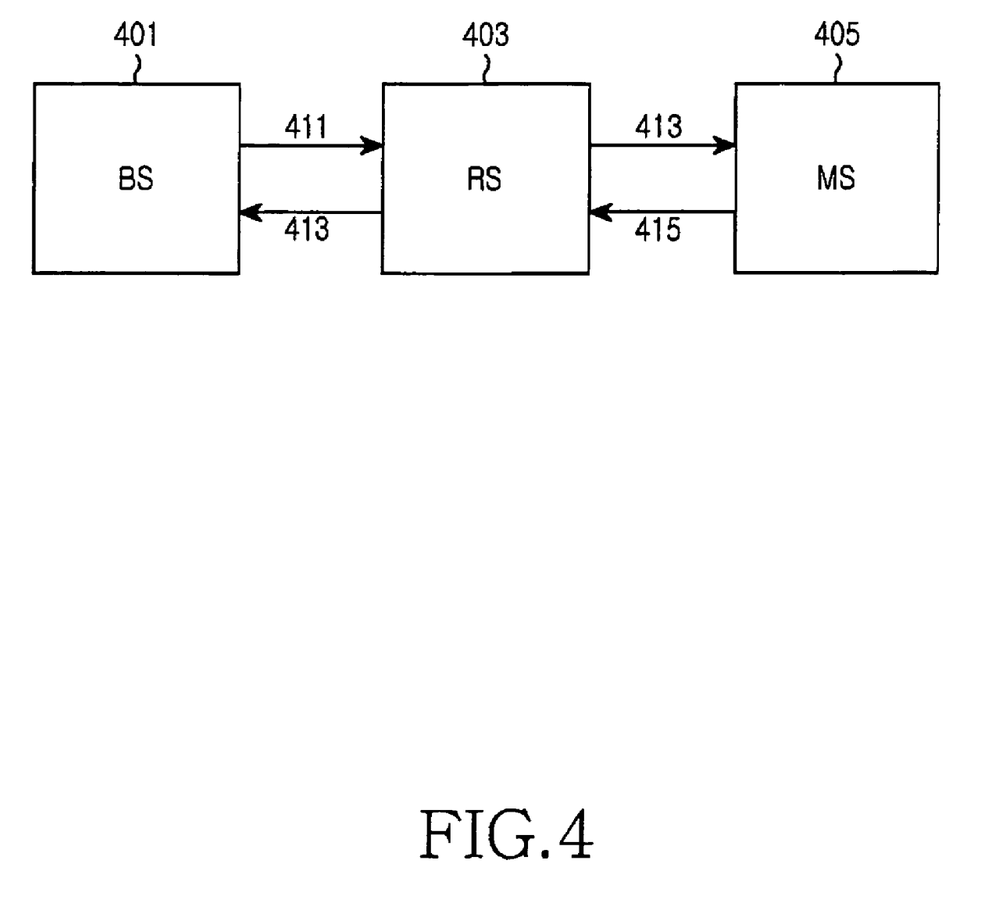
FIG. 4 illustrates a communication procedure via an RS in a TDD system according to the present invention.

Referring to FIG. 4, a BS 401 sends data to an MS 405 outside its cell area via an RS 403 to provide a better-quality radio channel. When the BS 401 sends data to the RS 403 in step 411, the RS 403 forwards the data to the MS 405 and forwards data received in the previous frame from the MS 405 to the BS 401 in step 413.

In step 415, the MS 405 sends data destined for the BS 401 to the RS 403.

Figure 5:
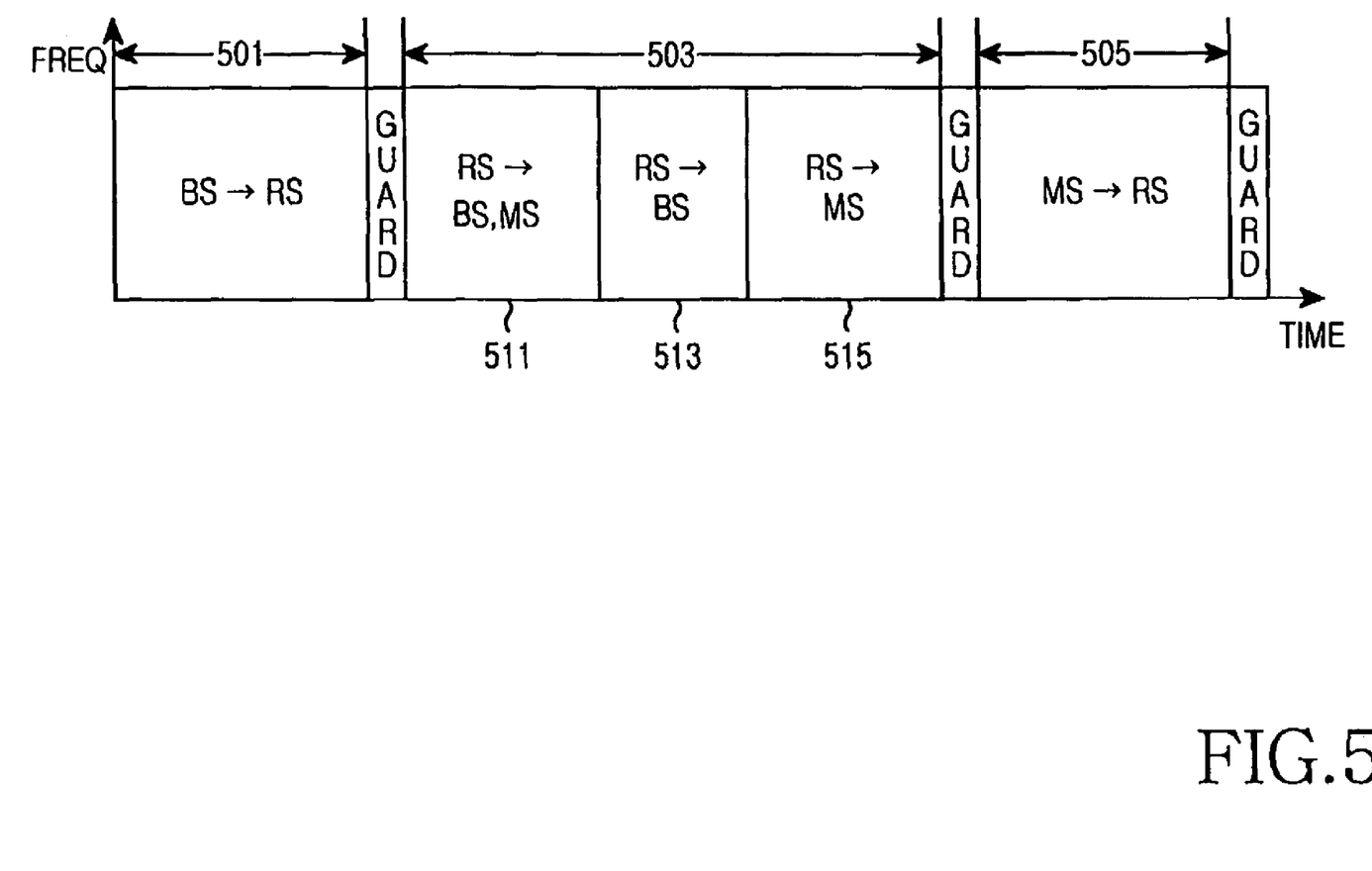
FIG. 5 illustrates a frame structure for communications via the RS in the TDD system according to the present invention.

For the above-described data transmission, the broadband wireless communication system adopts a frame structure illustrated in FIG. 5.

Referring to FIG. 5, a frame is divided into a first period 501 for which the BS sends downlink data to the RS, a second period 503 for which the RS forwards data to the BS or the MS connected to the RS, and a third period 505 for which the MS sends uplink data to the RS. For the second period 503, the RS forwards data received form the BS to the MS and forwards data received in the previous frame from the MS to the BS.

A guard region exists between every two adjacent data transmission periods, taking into account delay spread.

For efficient utilization of resources in a network coding scheme, the second period 503 is further branched into a period 511 for which the RS sends data to the BS and the MS simultaneously, a period 513 for which the RS sends data only to the BS, and a period 515 for which the RS sends data only to the MS.

During the period 511, the RS exclusive-OR (XOR) operates or masks data received from the BS with data of the previous frame received from the MS and sends the resulting data to the BS and the MS simultaneously. To recover the data, the BS and the MS each XOR-operate the data transmitted to the RS with the data received from the RS.

For example, if the BS sends '10111' to the RS during the first period (501) and the MS has sent '01010' to the RS in the previous frame during the third period (505), the RS creates '11101' by XOR-operating '10111' with '01010' and sends '11101' to the BS and the MS during the second period (503). Then the BS recovers '01010' transmitted in the previous frame by the MS by XOR-operating the received data '11101' with the transmitted data '10111', while the MS recovers '10111' transmitted by the BS by XOR-operating the received data '11101' with the transmitted data '01010'.

The periods 513 and 515 are implemented because of propagation errors. For example, when transmission data has error in either of the periods 501 and 505, the combined data sent from the RS to the BS and the MS has errors and data recovered through XOR operation by the BS and the MS also has errors.

Therefore, to prevent errors in one direction from affecting data in the other direction, the RS sends data to the BS and the MS during the separate periods 513 and 515, respectively.

Another reason for implementing the periods 513 and 515 is the Modulation and Coding Scheme (MCS) levels of the BS and the MS.

In the case of bit operation of two different data, communications are possible only if the BS and the MS that receive the bit-operated data have the same MCS level. Hence, transmission of XOR-operated (masked) data to the BS and the MS requires the same MCS level in the BS and the MS. If the same MCS level is set with respect to the MS with a relatively weak received signal strength, the other link suffers inefficient transmission.

Thirdly, downlink broadcasting information is sent to the MS during period 515. When a plurality of MSs exist and data received from the BS and the MS are XOR-operated, the RS has to include the broadcasting information in the individual XOR data for the MSs. As a consequence, the broadcasting information is redundantly sent.

Due to the difference between uplink and downlink data, the periods 513 and 515 are needed. XOR operation of data from the BS and the MS is equivalent to combining downlink data with uplink data. For example, if the BS sends data A, B and C to MS 1, MS 2 and MS 3, respectively and MS 1, MS 2 and MS 3 send data D, E and F, respectively, the RS successively sends A XOR D, B XOR E, and A XOR D, C XOR F.

If all the data A to F are different in length or the transmitted data is unidirectional, the RS sends the data to the BS and the MS separately during periods 513 and 1515.

As described above, the RS uses XOR operation to send data simultaneously to the BS and the MS during period 511.

When the BS and the MS send packets of different lengths, the following two ways can be considered.

The RS XOR-operates (masks) the packets from the BS and the MS according to the length of the shorter packet, and sends the excess part of the longer packet during period 513 or 515. This packet sent during period 513 or 515 has the Identifier (ID) of the MS. The MS ID may be sent at a different position depending on systems. That is, the MS ID may reside in the header of the packet or may be sent as a MAP information.

The other way is to XOR-operate the packets according to the length of the longer packet. Assuming that the packet from the BS is 100 bytes and the packet from the MS is 80 bytes, the RS inserts as many 0s as equivalent to 20 bytes in the 80-byte packet, prior to the XOR operation. Thus, the RS sends the XOR 100-byte packet, the MS ID, and information about the length of the shorter packet (80 bytes). Since both the BS and the MS know the lengths of their previous transmitted data, there is no need for including information about the entity sending the shorter packet (e.g. the BS or the MS).

Figure 6:
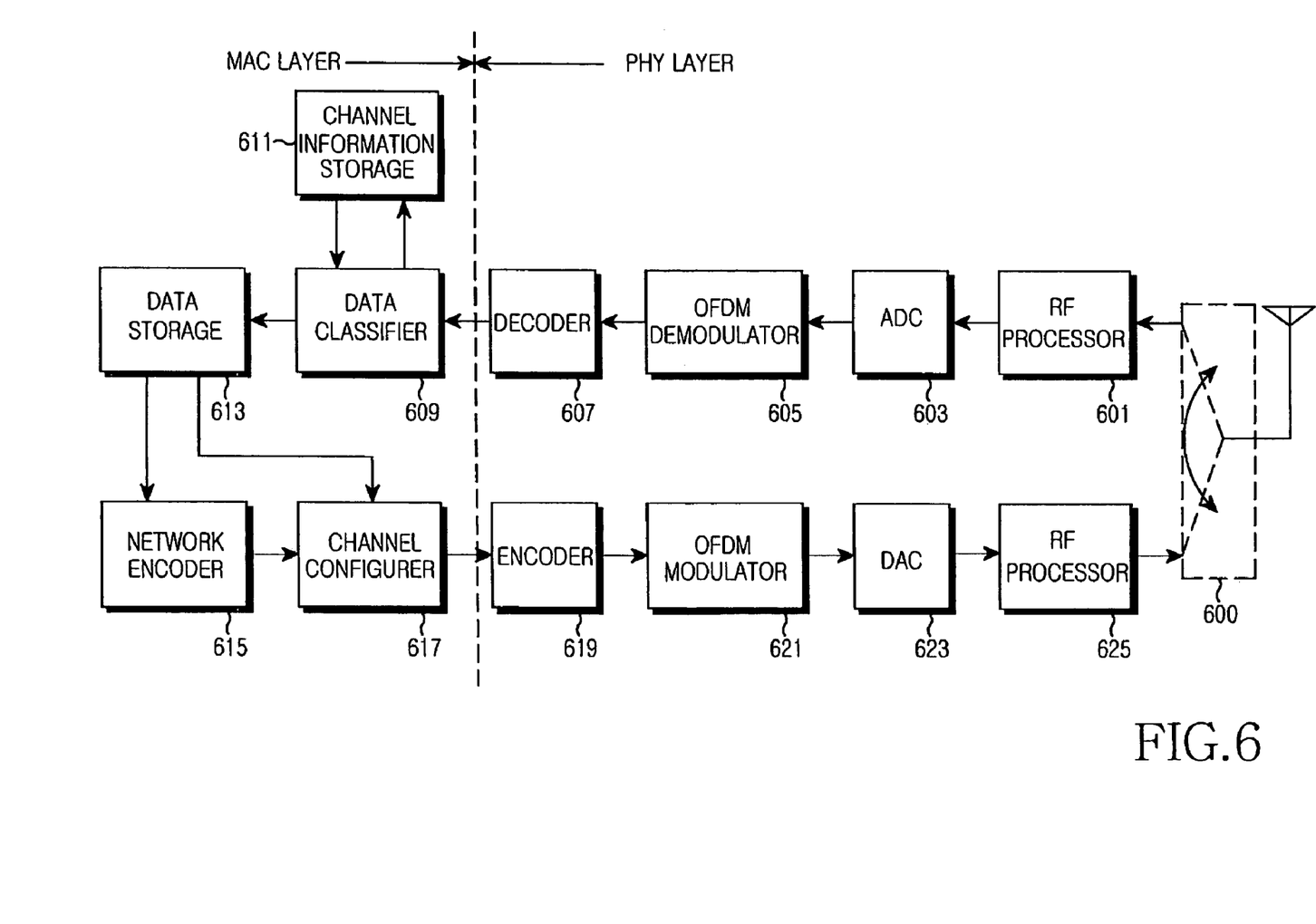
FIG. 6 is a block diagram of the RS in the TDD system according to the present invention.

Referring to FIG. 6, the RS includes a transmitter, a receiver, and a Radio Frequency (RF) switch 600.

The receiver is comprised of an RF processor 601, an Analog-to-Digital Converter (ADC) 603, an Orthogonal Frequency Division Multiplexing (OFDM) demodulator 605, a decoder 607, a data classifier 609, a channel information storage 611, and a data storage 613.

The RF processor 601 downconverts an RF signal received through an antenna to a baseband signal. ADC 603 converts the analog baseband signal to a digital signal. OFDM demodulator 605 converts time sample data received from ADC 603 to frequency data by Fast Fourier Transform (FFT). Decoder 607 demodulates the frequency data in a predetermined demodulation method and decodes the demodulated data at a predetermined coding rate.

The data classifier 609 classifies the decoded data according to a frame configuration method. Specifically, the data classifier 609 determines whether to combine (mask) the decoded data with data from the BS or the MS and send the combined (masked) data during period 511 illustrated in FIG. 5, or to send the decoded data during period 513 or 515 illustrated in FIG. 5. During the data classification, data classifier 609 uses MCS information of each user received from the channel information storage 611.

Channel information storage 611 receives feedback channel information, acquires each user's channel information from the feedback, and provides the channel information to data classifier 609.

Data storage 613 stores the data classified by data classifier 609 as data to be combined (masked) or as data to be sent alone distinguishably.

The transmitter is comprised of a network encoder 615, a channel configurer 617, an encoder 619, an OFDM modulator 621, a Digital-to-Analog Converter (DAC) 623, and an RF processor 625.

Network encoder 615 receives data to be combined from data storage 613 of the receiver and combines (masks) them. In accordance with the present invention, data from the BS is combined with data from the MS by XOR-operation.

Channel configurer 617 configures an actual channel with the combined (masked) data from network encoder 615 and non-combined (non-masked) data from data storage 613.

Encoder 619 encodes and modulates the data received from channel configurer 617 according to a coding rate and a modulation scheme corresponding to MCS level information. The modulation scheme can be Binary Phase Shift Keying (BPSK), Quadrature Phase Shift Keying (QPSK), 16-ary Quadrature Amplitude Modulation (16QAM), or 64QAM.

OFDM modulator 621 converts the coded data to time sample data (i.e. an OFDM symbol) by Inverse Fast Fourier Transform (IFFT). DAC 623 converts the sample data to an analog signal. RF processor 625 upconverts the baseband signal received from the DAC 623 to an RF signal and sends the RF signal through the antenna.

RF switch 600 switches a signal received through the antenna to the receiver and a transmission signal to the antenna.

Figure 7:
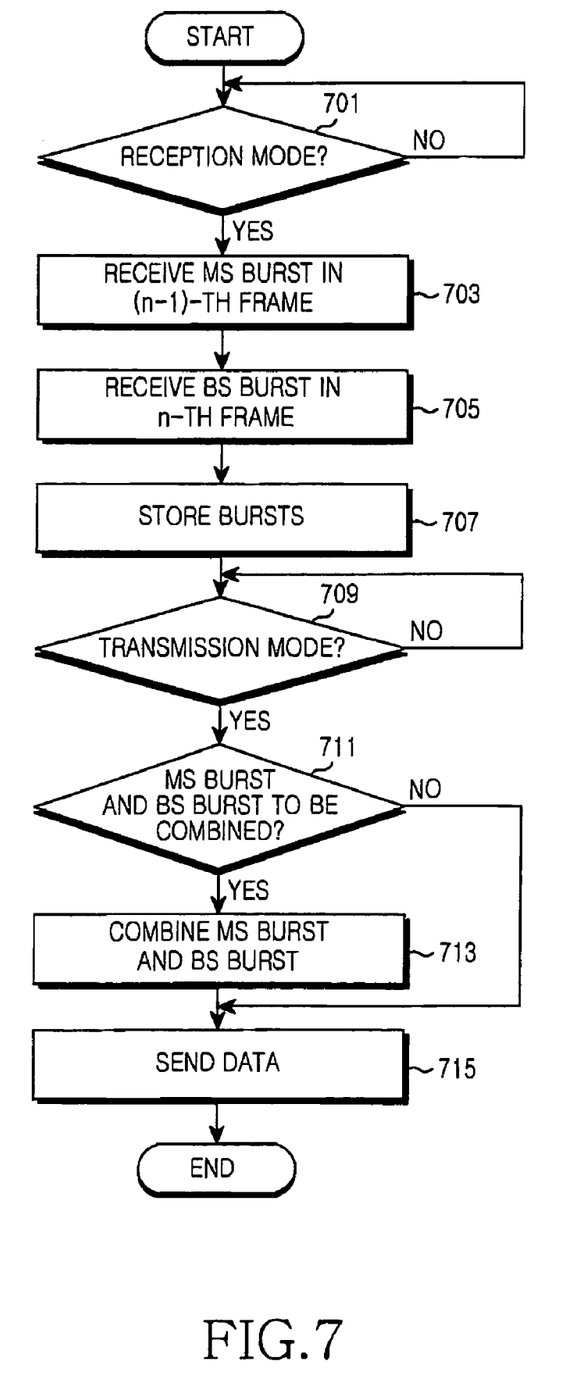
FIG. 7 is a flowchart illustrating a relay operation in the RS in the TDD system according to the present invention.

Referring to FIG. 7, the RS determines whether it operates in a reception mode in step 701. In the reception mode, the RS monitors reception of data in an $(n-1)^{th}$ frame from the MS in step 703.

In step 705, the RS monitors reception of data in an $n^{th}$ frame from the BS.

Upon receipt of the data from the BS, the RS classifies the received data from the MS and the BS according to a frame configuration method. For example, the RS determines whether to combine them or to send them separately, and stores the data in data storage 613 according to the determination. The determination is made according to the MCS levels and lengths of the data and according to whether the data have errors.

In step 709, the RS determines whether it is in a transmission mode. When the reception mode transitions to the transmission mode, the RS determines whether data to be sent is classified as combinable data in step 711.

In the case of combinable data, in step 713 the RS combines the data to be sent to the BS and the MS through XOR-operation in network encoder 615 illustrated in FIG. 6, and sends the combined data to the BS and the MS during period 511 illustrated in FIG. 5.

If the data to be sent is not classified as combinable data, in step 715 the RS sends the data to the BS and the MS, respectively during periods 513 and 515 illustrated in FIG. 5. Then the RS ends the process.

In accordance with the present invention as described above, for data transmission via an RS in a broadband wireless communication system, a frame is configured such that the data transmission periods of the RS are combined and thus three transmission periods are defined according to transmitting entities. As a result, overhead arising from transition gaps is reduced. Furthermore, since the RS sends data which are not overlapped between data received from a BS and data received from an MS and support network coding by use of a selective network coding scheme, the number of outgoing messages from the RS is reduced, and the messages are sent efficiently.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A Relay Station (RS) in a wireless communication system, comprising:
   a decoder for decoding demodulated received data;
   a channel information storage for acquiring channel information for each Mobile Station (MS) from feedback information received from the MS and storing the channel information;
   a data classifier for classifying decoded data as masked data to be sent after masking or as non-masked data to be sent separately; and a data storage for separately storing the masked data and the non-masked data, wherein the data classifier classifies the decoded data as masked data or as non-masked data according to one of channel information of an MS and a Base Station (BS) and the lengths of the received data.

2. The Relay Station of claim 1, wherein the channel information includes a Modulation and Coding Scheme (MCS) level.

3. The Relay Station of claim 1, further comprising:
a Radio Frequency (RF) processor for downconverting the received signal to a baseband signal;
an Analog-to-Digital Converter (ADC) for converting an analog signal received from the RF processor to a digital signal; and
a Fast Fourier Transform (FFT) processor for FFT-processing a time-domain digital signal received from the ADC.

4. The Relay Station of claim 1, wherein the channel information includes an MCS level.

5. The Relay Station of claim 1, wherein the data storage separately stores the masked data and the non-masked data classified by the data classifier and sends the stored data to a transmitter, when the RS transitions to a transmission mode.

6. A Relay Station (RS) in a wireless communication system, comprising:
a network encoder for masking data received from a Base Station (BS) with data received from a Mobile Station (MS), when it is determined that the data are to be sent in combination;
a channel configurer for configuring an actual transmission channel with the masked data and non-masked data received from the BS and the MS to be sent separately without masking; and
an encoder for encoding the configured channel data and modulating the coded data,
wherein it is determined whether the data are to be sent in combination according to one of Modulation and Coding Scheme (MCS) levels of the MS and the BS and the lengths of the received data.

7. The Relay Station of claim 6, wherein the network encoder masks the data received from the BS with the data received from the MS by exclusive-OR (XOR) operation.

8. The Relay Station of claim 6, wherein the channel configurer receives the masked data from the network encoder, receives the non-masked data received from the BS and from the MS, configures the actual transmission channel with the masked data and the non-masked data.

9. The Relay Station of claim 6, further comprising:
an Inverse Fast Fourier Transform (IFFT) processor for processing the modulated data;
a Digital-to-Analog Converter (DAC) for converting the IFFT digital signal to an analog signal; and
a Radio Frequency (RF) processor for upconverting the analog signal to an RF signal.

10. A method of relaying data in a Relay Station (RS) in a wireless communication system, comprising the steps of:
monitoring reception of data in an $(n-1)^{th}$ frame from a Mobile Station (MS) and reception of data in an $n^{th}$ frame from a Base Station (BS) in a reception mode;
classifying the data received from the MS and the data received from the BS as masked data to be sent in combination or as non-masked data to be sent separately, and storing the classified data distinguishably;
determining whether the stored data may be masked data or non-masked data, when the RS transitions to a transmission mode; and
masking the stored data if the stored data is to be masked data and sending the masked data to the BS and the MS,
wherein the classification step comprises classifying the data received from the BS and the data received from the MS according to one of the lengths of the received data and Modulation and Coding Scheme (MCS) levels of the MS and the BS.

11. The method of claim 10, wherein the masking step comprises: masking the data received from the BS with the data received from the MS by exclusive OR (XOR) operation.

12. The method of claim 10, further comprising: sending data to the BS in a BS transmission period and data to the MS in an MS transmission period, when the data are not to be sent masked.

* * * * *